United States Patent [19]

Alexander

[11] Patent Number: 4,760,415
[45] Date of Patent: Jul. 26, 1988

[54] FILM ADVANCE DEVICE FOR SURVEILLANCE CAMERAS

[75] Inventor: John G. Alexander, Richmond, Va.

[73] Assignee: Geotel, Inc., Richmond, Va.

[21] Appl. No.: 117,811

[22] Filed: Nov. 6, 1987

[51] Int. Cl.[4] ............................ G03B 1/12; G03B 9/10
[52] U.S. Cl. .................................. 354/173.1; 354/254
[58] Field of Search ............................... 354/173.1, 254

[56] References Cited

U.S. PATENT DOCUMENTS 3,429,245  2/1969  Novak ............................... 354/173.1
3,848,987  11/1974  Novak ............................... 354/173.1

Primary Examiner—Michael L. Gellner
Attorney, Agent, or Firm—Pearne, Gordon, McCoy & Granger

[57] ABSTRACT

A sequence camera for recording a series of images on a strip of photographic film employing a rotating shutter and an intermittant film advance mechanism. A motor drives the shutter and the film advance mechanism. The film advance mechanism utilizes a beater wheel with two protruding pins spaced unequally about the circumference and a spoke wheel with a plurality of spokes. As the motor drives the beater wheel, the pins intermittently engage the spokes of the spoke wheel, which, in turn, intermittently advances the film. The film is exposed by the shutter during the stationary period between advancements.

7 Claims, 2 Drawing Sheets

FILM ADVANCE DEVICE FOR SURVEILLANCE CAMERAS

BACKGROUND OF THE INVENTION

The present invention relates to sequence cameras for recording a series of images on a strip of photographic film.

The growth in the number of branch banks, all-night grocery stores and gas stations, and similar targets for robbery and pilferage have increased the need for reliable and inexpensive surveillance cameras.

This requirement encourages designs without the extensive features and performance of a typical "movie" camera. In particular, the rate at which the pictures are taken, or frame rate, need not be nearly as great. Frame rates of only 2 per second are typically adequate. In addition, a surveillance camera often need run only for a few minutes to capture all the events of interest. Mounted on a wall or ceiling, a surveillance camera need not be designed for small size or portability. Also, commercial electrical power is typically available to drive the camera.

A surveillance camera need not have a leaf or other complicated form of shutter. Because of the lack of serious size constraints, a simple rotating shutter may be employed. The typical rotating shutter is simply a disk with a pie-shaped cutout that is rotated between the film aperture and the camera lens. As the cutout passes the aperture, the film is exposed. In general, the exposure time is determined by the combination of the speed of rotation and the size of the cutout.

Of course, it is necessary to advance the film to the next picture location, or frame, prior to the next time the cutout rotates by the film aperture. Using a rotating shutter, the problem is to build an equally simple means to advance the film, appropriately synchronized to the shutter.

Separate motors for the shutter and film advance have been used. This not only necessitates the expense of two motors, but also requires complicated means to keep the two drive systems in synchronization. Also, a single motor can be employed and some form of clutching mechanism used to intermittently advance the film, while the shutter continuously rotates. This method still requires a complicated synchronization method.

The synchronization problem can be avoided by use of a common drive motor and positive, versus slipping or clutching, drive elements. The drawback has been increased mechanical complexity to provide the necessary intermittent film advance in conjunction with the continuous rotation of the shutter while ensuring a fixed or positive relationship between the shutter rotation and the film advance. Film advance mechanisms have been built using complicated pawl systems and complicated escapement gear trains.

SUMMARY OF THE INVENTION

The sequence camera herein disclosed provides a simple, inexpensive and reliable device to provide a series of images on a strip of photographic film.

A single motor positively drives both a rotating shutter and a film advance mechanism. The shutter includes a rotating shutter disk with a pie-shaped cutout. As the disk rotates, the cutout passes between a film aperture and a lens, exposing the film. While the film aperture is covered by the remaining portion of the disk, the film is advanced by the film advance mechanism to the next frame.

The film advance mechanism includes a beater wheel and a spoke wheel. The beater wheel, driven by the motor, has two protruding pins spaced unequally about its circumference. The spoke wheel has a series of protruding spokes equal-spaced about its circumference. The two wheels are located so that the spoke wheel rotates when the spokes are engaged by the pins on the rotating beater wheel. As the pins subtend less than a half revolution of the beater wheel, this engagememt only takes place during a portion of a beater wheel rotation, that is, intermittently. The spacing of the pins is such that the trailing pin engages the spoke immediately trailing the spoke engaged by the leading pin.

It is of course possible to use a beater wheel with only one pin or with more than two pins, the critical criterion being that the beater wheel only engage with the spoke wheel during the period of time the film is not being exposed by the shutter.

A film advance shaft on the spoke wheel engages a film take-up spool that advances the film by winding it onto the spool as the spool intermittently rotates with the shaft. It is also possible to use the shaft to advance the film with sprocket wheels, friction rollers and the like.

In the preferred embodiment, a ratchet continuously engages the spoke wheel, allowing it to turn only in one direction, to prevent possible film tension from rotating the spoke wheel in the nonadvancing direction while the spoke wheel is disengaged from the beater wheel. Also, a gear train is provided between the motor and the shutter disk to permit use of a smaller disk by allowing offset of the disk axis from the beater wheel axis. To aid smooth, quiet operation of the film advance mechanism, the pins and spokes are covered with a friction reducing material.

DESCRIPTION OF THE PREFERRED EMBODIMENT

Figure 1:
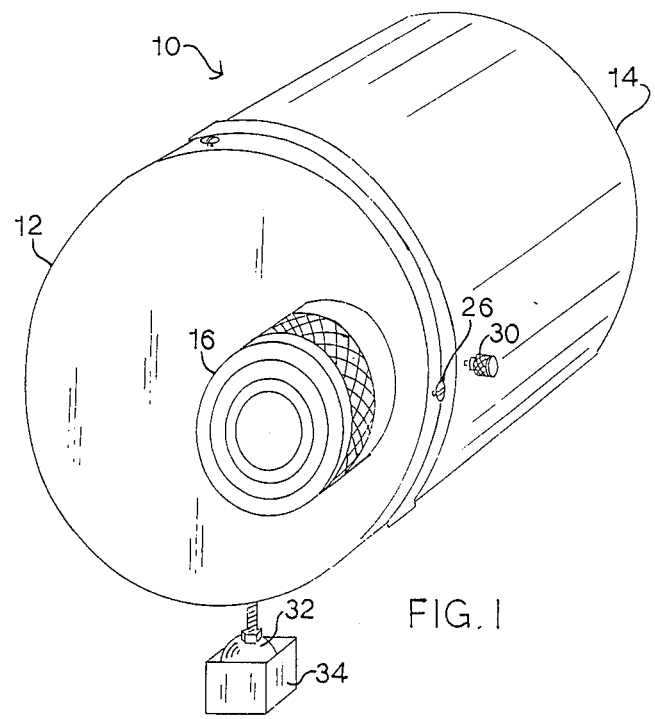
FIG. 1 is a perspective view of the camera mounted within a cover.
Figure 2:
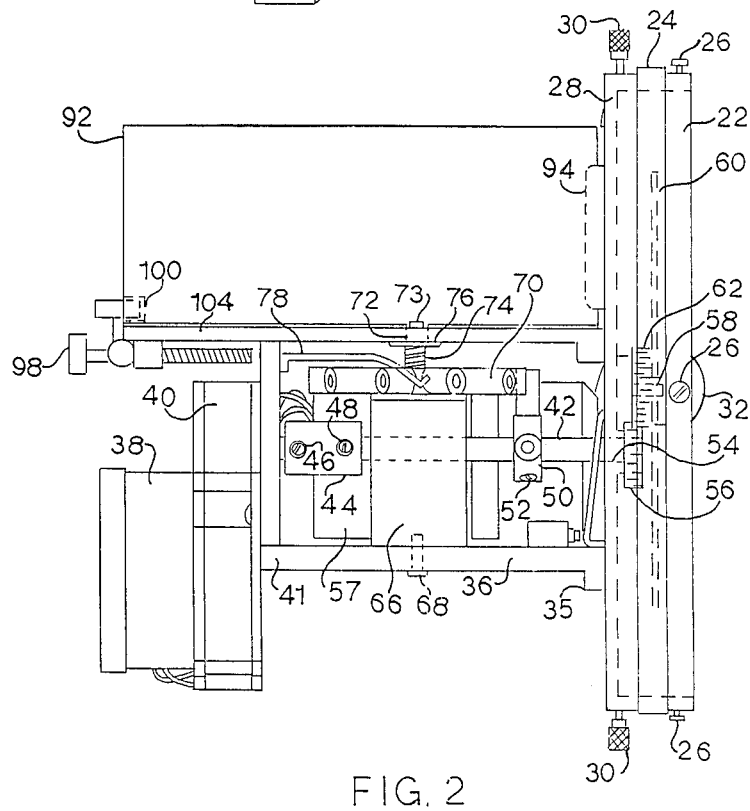
FIG. 2 is a top plan view of the camera without a cover.
Figure 3:
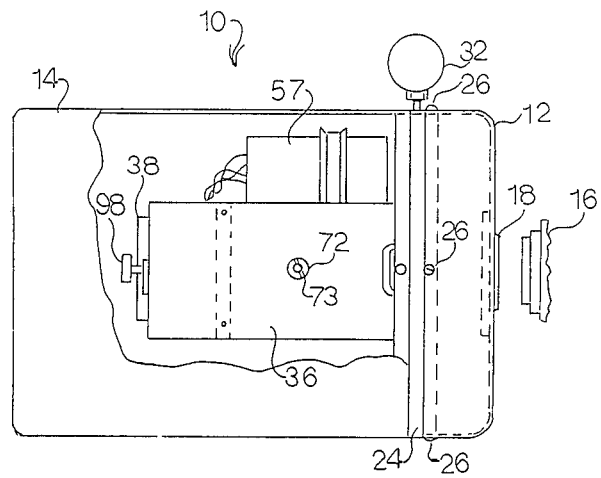
FIG. 3 is a side elevation view of the camera with a portion of the cover cut away and a portion of the lens shown exploded away from the camera.
Figure 4:
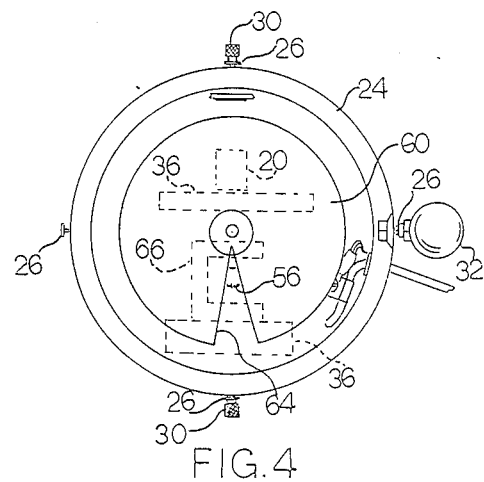
FIG. 4 is a front elevation view of the camera without a cover.

Referring to FIGS. 1 and 3, the camera 10 is shown enclosed in front cover 12 and rear cover 14. Lens 16 is mounted (e.g., by a Pentax screw thread) in lens aperture 18 in front cover 12 in axial alignment with film aperture 20 (FIG. 4). Referring also to FIG. 2, front cover 12 slides onto front lip 22 on mounting member 24 and is held in place by machine screws 26. Rear cover 14 slides onto rear lip 28 on mounting member 24 and is held in place by knurled screws 30. The camera 10 is mounted to a convenient support by ball 32 and socket 34, allowing convenient aiming of the camera 10.

Referring to FIG. 2, the front 35 of housing 36 is attached to mounting member 24. Electric motor 38 with integral gear box 40 is structurally mounted to the rear 41 of housing 36. The output shaft of gea box 40 is coupled to shutter drive shaft 42 by axial coupling 44 using setscrews 46 and 48. Beater wheel 50 is axially fixed to shutter drive shaft 42 using setscrew 52. The front portion 54 of shutter drive shaft 42 is journaled in mounting member 24 and terminates in drive gear 56. Motor capacitor 57 is attached to housing 36, as shown in FIGS. 2 and 3.

Shutter axle 58 is fixed to mounting member 24. Shutter disk 60 is coaxially fixed to shutter gear 62 and both are rotatably mounted on shutter axle 58. Drive gear 56 engages shutter gear 62. Shutter disk 60 contains a pie-shaped cutout 64, rotatable in front of film aperture 20.

U-shaped spoke wheel base 66 is attached to housing 36 by screw 68. Spoke wheel 70 is rotatably mounted on base 66 by an axle (not shown). Film drive shaft 72 is journaled in housing 36 and is in sliding splined engagement with spoke wheel 70. The film drive end of shaft 72 ends in a blade-like protrusion 73. Spring 74 is positioned coaxially between drive shaft 72 and spoke wheel 70 and urges shaft 72 away from spoke wheel 70. Lip 76 on drive shaft 72 provides a thrust bearing surface against housing 36 to retain shaft 72 in splined engagement with spoke wheel 70. Ratchet 78 is attached to housing 36 and engages the spoke wheel 70.

Figure 6:
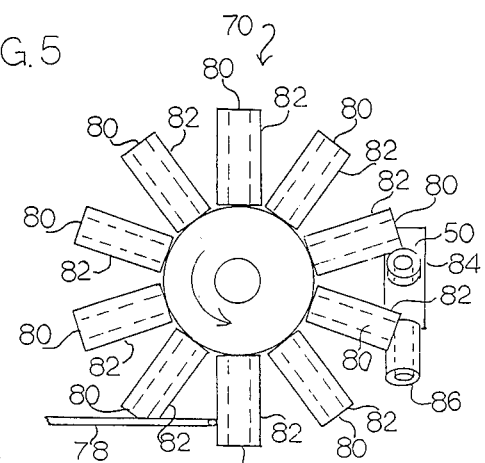
FIG. 6 is a fragmentary, top plan view of the spoke wheel, beater wheel and ratchet in operational orientation.
Figure 7:
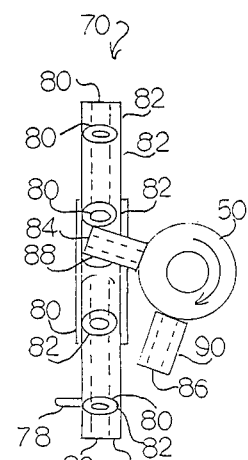
FIG. 7 is a fragmentary, front elevation view of the spoke wheel, beater wheel and ratchet in operational orientation.

The relationship of beater wheel 50, spoke wheel 70 and ratchet 78 is shown in FIGS. 6 and 7. This simple mechanism constitutes a simple and reliable, inexpensive means to advance the camera's film. Each spoke 80 on the spoke wheel 70 is covered by a sleeve 82 made of a friction reducing material (e.g., Teflon). Pins 84 and 86 of beater wheel 50 are covered by sleeves 88 and 90, respectively, also made of a friction reducing material. As beater wheel 50 rotates as indicated, leading pin 84 eventually engages one of the spokes 80. This forces spoke wheel 70 to rotate with beater wheel 50. As beater wheel 50 continues rotation, trailing pin 86 moves into engagement with the next spoke on spoke wheel 70, causing further rotation of spoke wheel 70. Once trailing pin 86 moves out of engagement with spoke wheel 70, spoke wheel 70 stops rotation until leading pin 84 again rotates into engagement with spoke wheel 70. Ratchet 78 successively engages each spoke 80, preventing rotation of the spoke wheel 70 opposite to that indicated.

Figure 5:
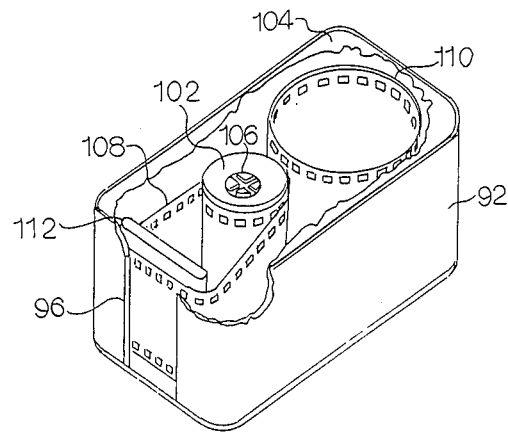
FIG. 5 is a perspective view of the film magazine with a portion cut away to show the film and take-up spool arrangement.

Film magazine 92 (FIG. 5) is removably mounted to housing 36 and mounting member 24 by engagement of film aperture protrusion 94 within film window 96 and engagement of rotating latch 98 in pocket 100. When magazine 92 is mounted, film drive shaft 72 engages film take-up spool 102. FIG. 5 shows a cut away perspective view of magazine 92 with the housing side 104 of magazine 92 facing up. Drive slots 106 of take-up spool 102 are engageable by film drive shaft 72 through a hole (not shown) in magazine 92. The head of a film strip 108 (e.g., 35 mm motion picture film) is attached to take-up spool 102 and is drawn from a coil of unexposed film 110, around backing plate 112 and onto spool 102 as the spool is rotated.

In operation, a film magazine 92 is mounted in place by latch 98. The protrusion 73 of film drive shaft 72 either engages immediately in one of the drive slots 106 or is pushed within housing 36 against the pressure of spring 74 by sliding along the splined engagement between spoke wheel 70 and drive shaft 72. If not immediately engaged, the protrusion 73 engages with slots 106 upon the initial rotation of the spoke wheel.

When energized, motor 38 drives shutter drive shaft 42 through gear box 40, and drive gear 56 rotates and drives shutter gear 62. Shutter gear 62 and shutter disk 60 then rotate. As disk 60 rotates, shutter cutout 64 rotates by film aperture 20, exposing the film 108 to the image projected by lens 16 for a predetermined time (e.g., 1/65 second).

While film aperture 20 is covered by the rotating shutter disk 60 and, hence, not exposed to the image, leading pin 84 of the also rotating beater wheel 50 engages a spoke 80 of spoke wheel 70. The spoke wheel 70 then rotates as urged by leading pin 84. Trailing pin 86 then engages the next spoke 80 on the spoke wheel 70 and further rotates the spoke wheel 70.

As spoke wheel 70 rotates, film drive shaft 72 and take-up spool 102 engaged with film drive shaft 72 also rotate. Film drive shaft 72 advances film 108 to the next frame by winding the film 108 onto take-up spool 102. As trailing pin 86 rotates out of engagement with spoke wheel 70, a new film frame is in position and ready for shutter cutout 64 to again rotate by film aperture 20. Ratchet 78 successively engages each spoke 80, thereby preventing reverse rotation of spoke wheel 70 that may otherwise occur due to film winding tension. The sequence of film frame exposure and film advance to the next frame repeats (e.g., 2 frames per second) until the camera runs out of film (e.g., 300 frames or 20 feet of film) or the motor 38 is de-energized.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A camera driven by a motor for photographing a sequence of images upon a strip of photographic film, comprising:
    (a) a rotating shutter, said shutter operably connected to said motor;
    (b) a rotating beater wheel, said beater wheel being drivenly connected to said motor and having a pin-like projection; and
    (c) a rotatable spoke wheel, said spoke wheel having an axial film driving shaft and a plurality of spokes, said shaft operably engageable to advance said film and said spokes being successively intermittently engaged by said projection, wherein said film is intermittently advanced by intermittent rotation of said spoke wheel and said shutter exposes said film while said film is stationary.

2. A camera according to claim 1, wherein said beater wheel further comprises a second pin-like projection, said second projection being located to engage a spoke next in succession after the spoke engaged by said first projection.

3. A camera according to claim 1, wherein said rotating shutter further comprises:
  (a) a shutter drive shaft, said drive shaft drivenly connected to said motor;
  (b) a shutter gear train, the input of said gear train drivenly connected to said drive shaft; and
  (c) a shutter wheel, said shutter wheel drivenly connected to the output of said gear train, wherein a complete rotation of said shutter wheel takes place for each intermittent film advance.

4. A camera according to claim 1, wherein said projection is covered with a friction reducing material.

5. A camera according to claim 1, wherein said spokes are covered with a friction reducing material.

6. A camera according to claim 1, further comprising a ratchet, said ratchet operably engaging said spoke wheel.

7. A camera according to claim 1, further comprising a film magazine, said film magazine having a rotatable film take-up spool operably engageable with said film driving shaft, wherein said film is advanced by being wound upon said spool as said spoke wheel rotates.

* * * * *